United States Patent [19]
Martin

[11] 3,952,284
[45] Apr. 20, 1976

[54] VARIABLE FLUID PRESSURE ACTUATED VEHICLE TAIL LIGHT SYSTEM

[75] Inventor: Robert D. Martin, Dallas, Tex.

[73] Assignee: The Raymond Lee Organization, Inc., New York, N.Y.

[22] Filed: Oct. 9, 1974

[21] Appl. No.: 513,468

[52] U.S. Cl. ................................. 340/71; 200/81.4
[51] Int. Cl.² ................. B60Q 1/26; H01H 35/24
[58] Field of Search ............... 340/66, 71, 72, 262; 200/81.4, 82

[56] References Cited
UNITED STATES PATENTS

| | | | |
|---|---|---|---|
| 3,164,803 | 1/1965 | Leichenring | 340/71 X |
| 3,528,056 | 9/1970 | Voevodsky | 340/262 X |
| 3,705,535 | 12/1972 | Cohen et al. | 200/81.4 |

FOREIGN PATENTS OR APPLICATIONS

| | | | |
|---|---|---|---|
| 1,234,553 | 2/1967 | Germany | 340/71 |

Primary Examiner—Donald J. Yusko
Attorney, Agent, or Firm—Howard I. Podell

[57] ABSTRACT

A tail light system for a vehicle which indicates the severity of braking action of the equipped vehicle. Multiple tail lights are each operated by individual switches linked to the hydraulic brake system so that the quantity or color of the indicated lights is responsive to the pressure of the hydraulic brake system, with each switch responsive to a different hydraulic pressure.

1 Claim, 1 Drawing Figure

U.S. Patent   April 20, 1976   3,952,284
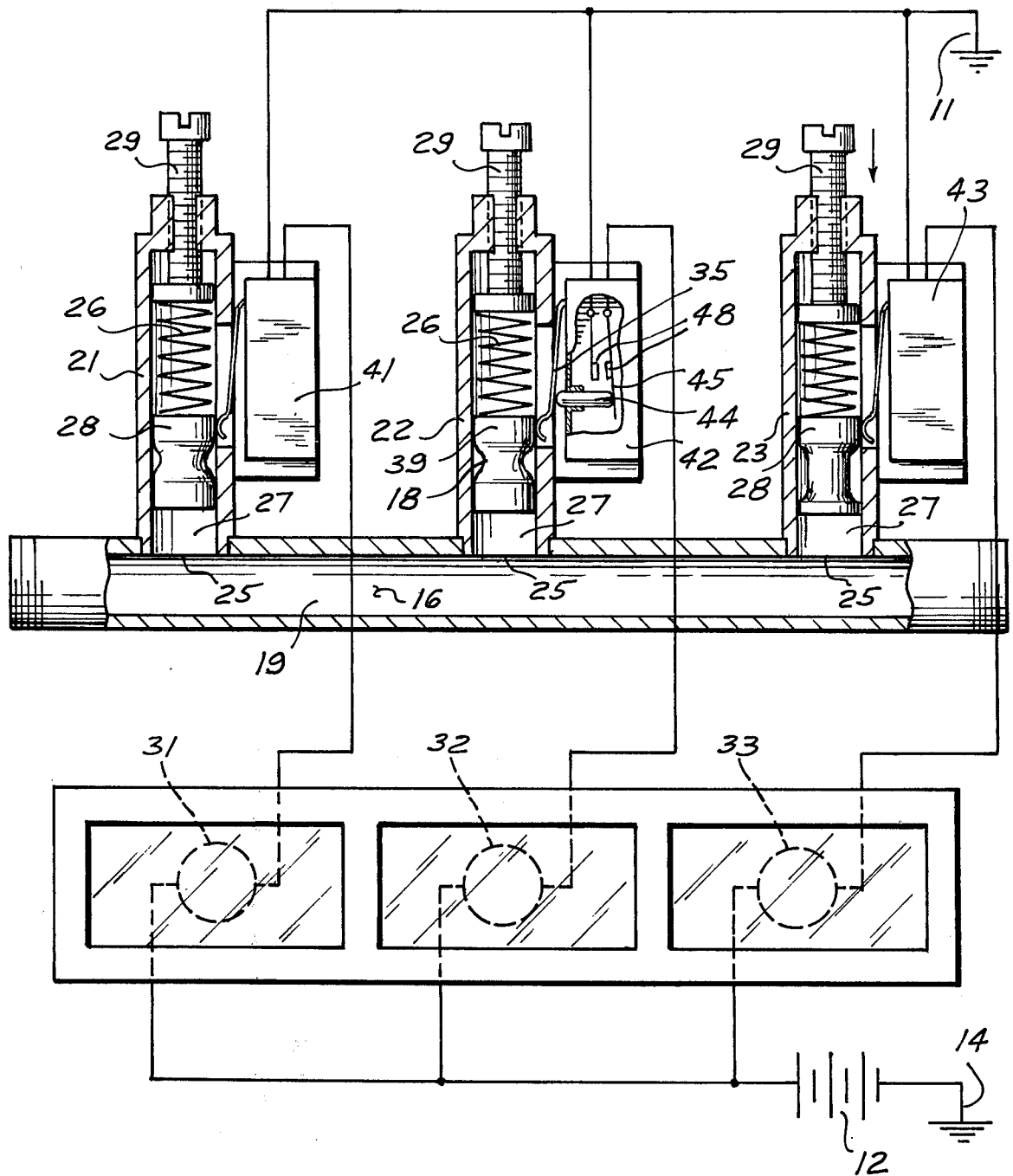

VARIABLE FLUID PRESSURE ACTUATED VEHICLE TAIL LIGHT SYSTEM

SUMMARY OF THE INVENTION

My invention relates to a vehicle tail light system that warns following drivers of the degree of braking action and deceleration of the equipped vehicle.

In my invention, a group of tail lights mounted on a vehicle are individually activated by electric switches responsive to the hydraulic pressure of the braking system, with the quantity or color of the displayed lights responsive to the magnitude of the brake system hydraulic pressure.

Each electric switch is actuated by a spring-biased piston in a cylinder linked to the hydraulic brake system fluid, with the actuator arm of the switch riding against the side of the piston. A recess in the piston sidewall permits movement of the switch actuator arm, which rides against the piston sidewall. The setting of the piston spring is varied by a screw to adjust the throw of the piston to the hydraulic pressure and to thus regulate the resposniveness of the switch to braking aciton.

BRIEF DESCRIPTION OF THE DRAWING

The objects and features of the invention may be understood with reference to the following detailed description of an illustrative embodiment of the invention, taken together with the accompanying drawings in which:

The Figure illustrates a schematic drawing of the invention.

DESCRIPTION OF THE PREFERRED EMBODIMENT

Turning now descriptively to the drawings, in which similar reference characters denote similar elements throughout the several views, the Figure is a schematic drawing of the electrical circuitry and switches of the invention.

A series of three tail lights 31, 32 and 33, each mounted on the rear of a vehicle, are individually electrically connected to electric switches 41, 42 and 43 respectively which are each in series to the common ground connection 11. The three lights 31, 32 and 33 connected in parallel to a pole of the vehicle battery 12, the other pole of which is connected to the ground 14.

Since each switch 41 and hydraulic actuator 21, 22 and 23 is similarly constructed, switch 42 and hydraulic actuator 22 will be described as typical.

Hydraulic actuator 21 consists of a cylinder 27 connected to the hydraulic tube 19 of the brake system, with a shaped piston 28 riding in the cylinder 27 and biased towards the cylinder inlet 25 by a compression spring 26 which is maintained under pressure by an adjustment screw 29.

A recess 18 is formed in the mid section of the side wall 39 of piston 28, with the actuator arm 35 of the switch 42 spring-mounted to ride against sidewall 39. Actuator arm 35 is linked by plunger 44 to movable switch contact 45, with movement of actuator arm 35 in the direction away from piston sidewall 39 serving to open the switch contacts 48, and movement of actuator arm 35 into the recess 18 of the piston sidewall acting to close the switch contacts 48. The setting of adjustment screw 29 varies the pressure of spring 26 to result in recess 18 of the piston moving into engagement with switch actuator arm 35 at a particular pressure of the hydraulic fluid 16 in brake tube 19 and cylinder 27.

Each switch 41, 42 and 43 may be set so as to energize the attached tail light at a particular pressure of brake fluid 16 and depending on the shape of recess 18, a switch may be set to turn off at an increased hydraulic pressure or to remain in the ON position at all pressures above the initial actuation pressure.

Tails lights 31, 32 and 33 may be of the same color or of different colors or intensities, as desired.

Since obvious changes may be made in the specific embodiment of the invention described herein, such modifications being within the spirit and scope of the invention claimed, it is indicated that all matter contained herein is intended as illustrative and not as limiting in scope.

What is claimed is:

1. A vehicle tail light indication system which indicates the severity of braking application of the vehicle in which it is installed comprising
    a multiplicity of tail lights each individually connected to an individual electric switch,
    each said electric switch being linked by mechanical means to the hydraulic fluid of the hydraulic brake line of the attached vehicle, each said switch being responsive in action to the magnitude of hydraulic pressure of the brake line, with each switch fitted with adjustment means to regulate the threshold responsiveness of the switch to a specific magnitude of hydraulic pressure, so that the braking application effect is indicated by the number of tail lights that are simultaneously actuated.

* * * * *